United States Patent [19]

Harrison

[11] Patent Number: 5,019,849

[45] Date of Patent: May 28, 1991

[54] FILM CHANGING TENT WITH INTERNAL SUPPORT STRUCTURE

[76] Inventor: Patricia L. Harrison, 2028 Sanborn Ave., Los Angeles, Calif. 90027

[21] Appl. No.: 278,675

[22] Filed: Dec. 1, 1988

[51] Int. Cl.[5] .............. G03B 17/56

[52] U.S. Cl. .............. 354/308

[58] Field of Search .............. 354/308, 309; 135/98

[56] References Cited

U.S. PATENT DOCUMENTS

| | | | |
|---|---|---|---|
| 3,060,819 | 10/1962 | Tohill | 354/308 |
| 3,874,397 | 4/1975 | Oberhaus | 135/98 |
| 4,731,627 | 3/1988 | Chisholm | 354/308 |

FOREIGN PATENT DOCUMENTS

| | | | |
|---|---|---|---|
| 14239 | 1/1885 | United Kingdom | 354/308 |

*Primary Examiner*—A. A. Mathews

*Attorney, Agent, or Firm*—Blakely, Sokoloff, Taylor, Zafman

[57] ABSTRACT

A collapsible film changing tent having inner and outer light-impervious fabric liners connected to a light-impervious fabric floor around the periphery thereof defines an enclosure. An integral support means is fixably connected to at least one shell, and preferably, is disposed between said outer shell and said inner shell. A pair of light-impervious fabric sleeves are in communication with the enclosure extending from outside the outer shell and a door having a closure mechanism is disposed on one side of the outer shell with a second door adjacent thereto in the inner shell, but preferably not in alignment therewith to minimize entry of light therethrough.

8 Claims, 6 Drawing Sheets

FILM CHANGING TENT WITH INTERNAL SUPPORT STRUCTURE

BACKGROUND OF THE INVENTION

1. Field of the Invention

This invention relates to a film changing tent, and more particularly a film changing tent having a self-contained and collapsible internal support structure for use in changing film at remote locations.

2. Art Background

Currently, if possible, film for motion picture cameras, specialty cameras and large format cameras must be loaded into film containers and cameras in virtually total darkness. For instudio operations and other indoor film changing, it is generally a simple matter to change the film, or load the camera, in a standard darkroom or other darkened room or closet. However, for outdoor settings or otherwise remote locations without the necessary darkroom facilities, film-changing has been more difficult.

To overcome this problem, film-changing bags were developed. A film changing bag is a bag formed of generally lightimpervious material which can be placed on a table or the ground, and the film may be changed or loaded therein. However, this collapsed bag system has the drawback of having a film changing area which is generally collapsible and therefore does not provide a sufficient amount of room without the film possibly contacting the bag, or, as a result of restrictions in the space, making it difficult and slow to change the film.

A recent innovation in this regard is disclosed in my copending Design Patent application Ser. No. 943,912, entitled "Film Changing Bag", now U.S. Pat. No. D302,170, and U.S. Pat. No. 4,731,627, disclosing an enclosure for loading film in the form of a miniature dome-shaped tent having an external frame which can be disassembled when not in use. These devices comprise film changing tents having an external support structure. In particular, the prior art film changing tents have flexible tubes which are disposed within loops or sleeves on the outside of the tent forming a crossed pattern across the top of the tent and locking at each of four corners at the base. The prior art tents are made of at least two layers of material to ensure that no light enters the tent. Two armholes are disposed in one side which allow access to the interior of the tent so that the user can manipulate the film, camera and any other materials and accessories contained in the film changing tent.

However, it has been found that there are certain drawbacks with this design. First of all, because the exterior frame structure comprises a plurality of flexible poles disposed through exterior loops, setting up the film changing tent requires a few minutes of manipulation. Moreover, because several poles are required, it is possible to lose or misplace the pole when the tent is not in use. Moreover, the exterior frame structure requires a few minutes for disassembly and careful securing of the frame elements to minimize the risk of loss. This and other disadvantages are overcome by the present invention which is described in general below.

SUMMARY OF THE INVENTION

The present invention comprises a film changing tent having a frame structure which is internal to the exterior thereof. The film changing tent support members are disposed within the tent and do not have to be handled in the setting up and taking down of the film changing tent. The support members comprise an umbrella-like structure which forms an inverted cup-shaped tent which can be virtually instantaneously set up in operational mode and disassemble into a cylindrical shape for storage and transportation.

The invented film changing tent is comprised of an outer liner and an inner liner. In the preferred embodiment, disposed between the outer liner and inner liner is the support structure. In the preferred embodiment the support structure is secured in place at four corners of the tents by loops sewn along the seams of the inner liner. The umbrella-like support structure can be easily popped into its full open position by means of a over center lock device which locks the umbrella-like structure open. By disengaging the over center lock device, the umbrella-like structure is collapsed so the device is formed into a cylindrical-shaped compacted form so that it can be transported. Zippers are supplied in each of the material to provide access to the interior for inserting the film, film containers and camera or other implement inside the device before opening the film to the environment.

It is an object of this invention to provide a transportable film changing tent having an open and solid interior to provide a sufficient amount of space for easily and conveniently changing film.

It is yet another object of the present invention to provide a film changing tent comprising two layers of light-impervious material, the seams of each of which being non-overlapping so that no light can get through to the interior of the device when in operation.

It is another object of the present invention to provide a film changing tent which can be quickly assembled.

Yet another object of the invention it to provide a film changing tent which can be quickly and easily disassemble for storage and transportation.

Yet another object of the present invention is to provide a self-contained film changing tent without any additional parts separate and apart from the unitary device.

The invention comprises various features and combinations of parts as hereinafter described and illustrated in the accompanying drawings and claimed in the claims appended hereto. It will be understood by a person of ordinary skill in the art that various changes in the invention as set forth in the detailed description below may be made without departing from the spirit and scope of the present invention.

DETAILED DESCRIPTION OF THE INVENTION

Figure 1:
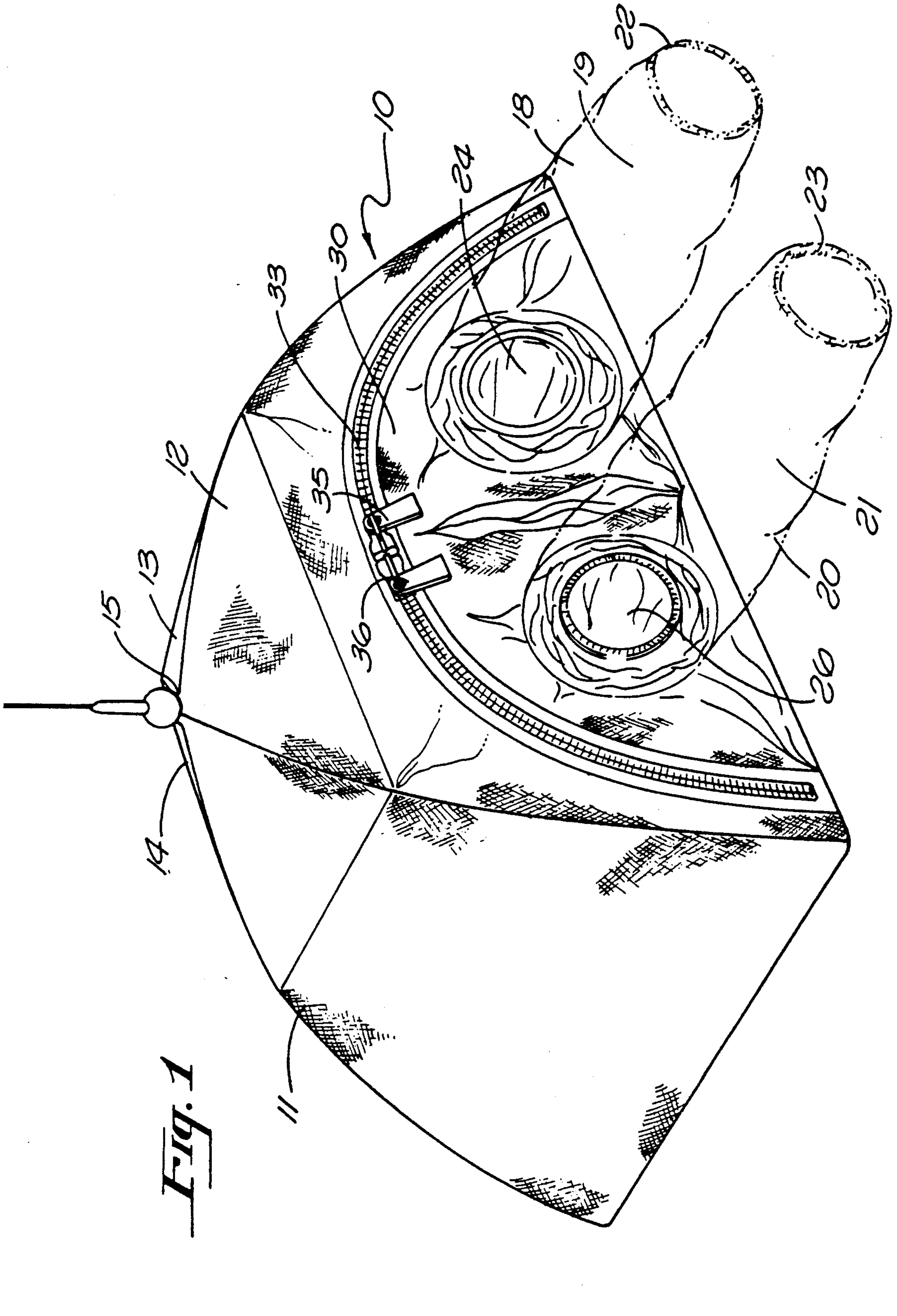
FIG. 1 is a perspective view of the invented film changing tent in its operational position, with the arm members shown in ghostlines.
Figure 3:
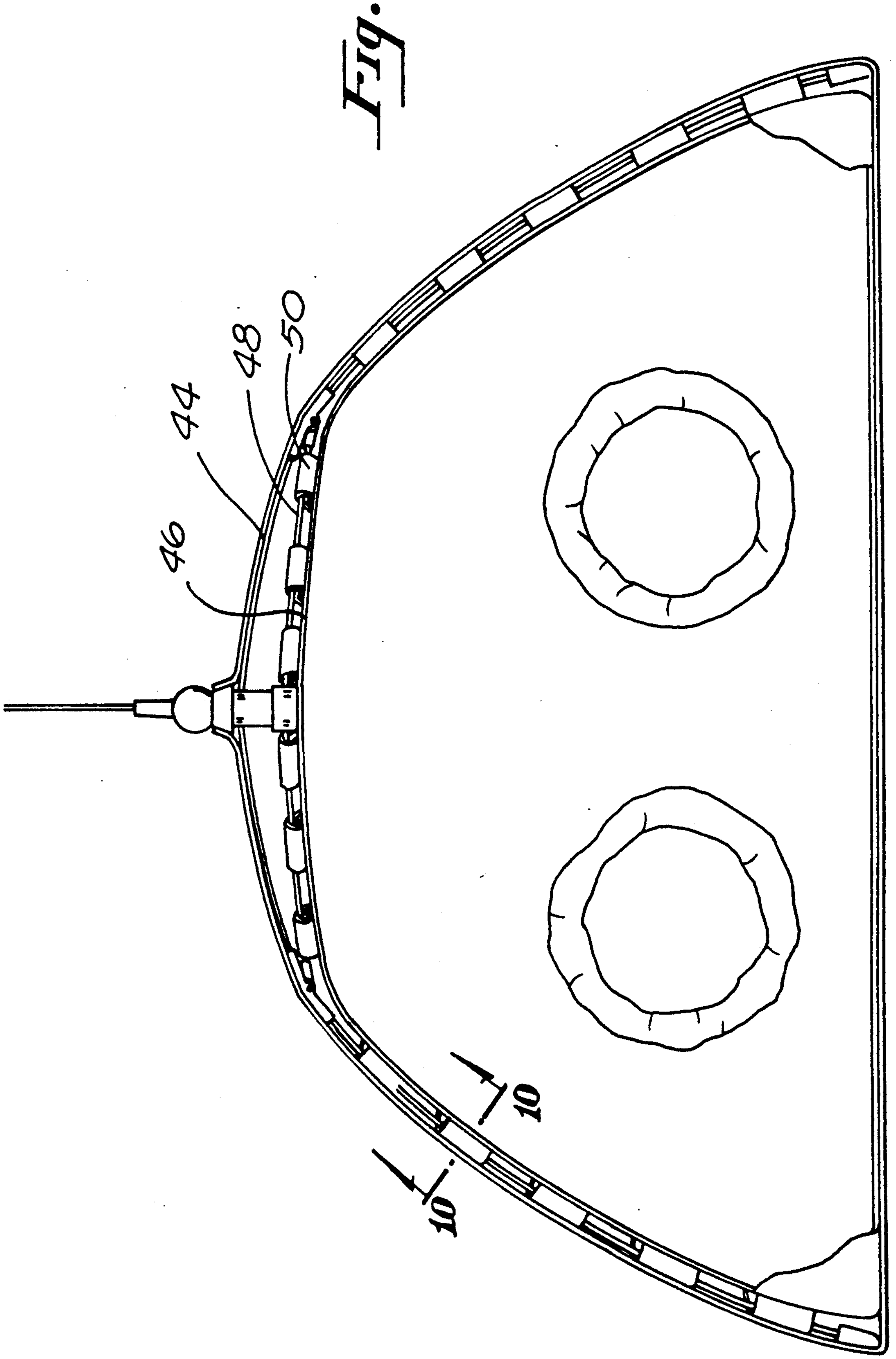
FIG. 3 is a sectional view of Lines 3—3 of FIG. 2 showing the interior of the present invention.

Referring now to the Figures which set forth the preferred embodiment of the subject invention, a film changing tent 10 is shown comprising a plurality of sections 11, 12, 13, and 14, forming a general dome-shape in the open position and having a flat bottom 17 when in the open position as shown in FIG. 3. On one of the sections, section 12 as shown in FIG. 1, there is provided various means for entry into the interior of the film changing tent 10. As shown, there are two sleeves 18 and 20 each including a body member 19 and 21, respectively, and elastic cuffs 22 and 23, respectively, and each attaches to the film changing tent 10 and surrounds holes 24 and 26 therein which permit access to the interior of the film changing tent 10. The sleeves 18 and 20 are spaced sufficiently apart to provide comfortable access for a normal-sized user to the interior of the tent. The holes 24 and 26 do not necessarily have to be shoulder-width apart because the user's arms should angle inward if desired and further because the hands of the individual may sometimes need to contact each other in order to conveniently handle the film inside. The cuffs 22 and 23 are sufficiently elastic and sized so that they fit tightly over the arms of a normal user in order to prevent light from entering into the film changing tent. In an alternative embodiment, the sleeves may be disposed on different sides of the film changing tent.

Figure 2:
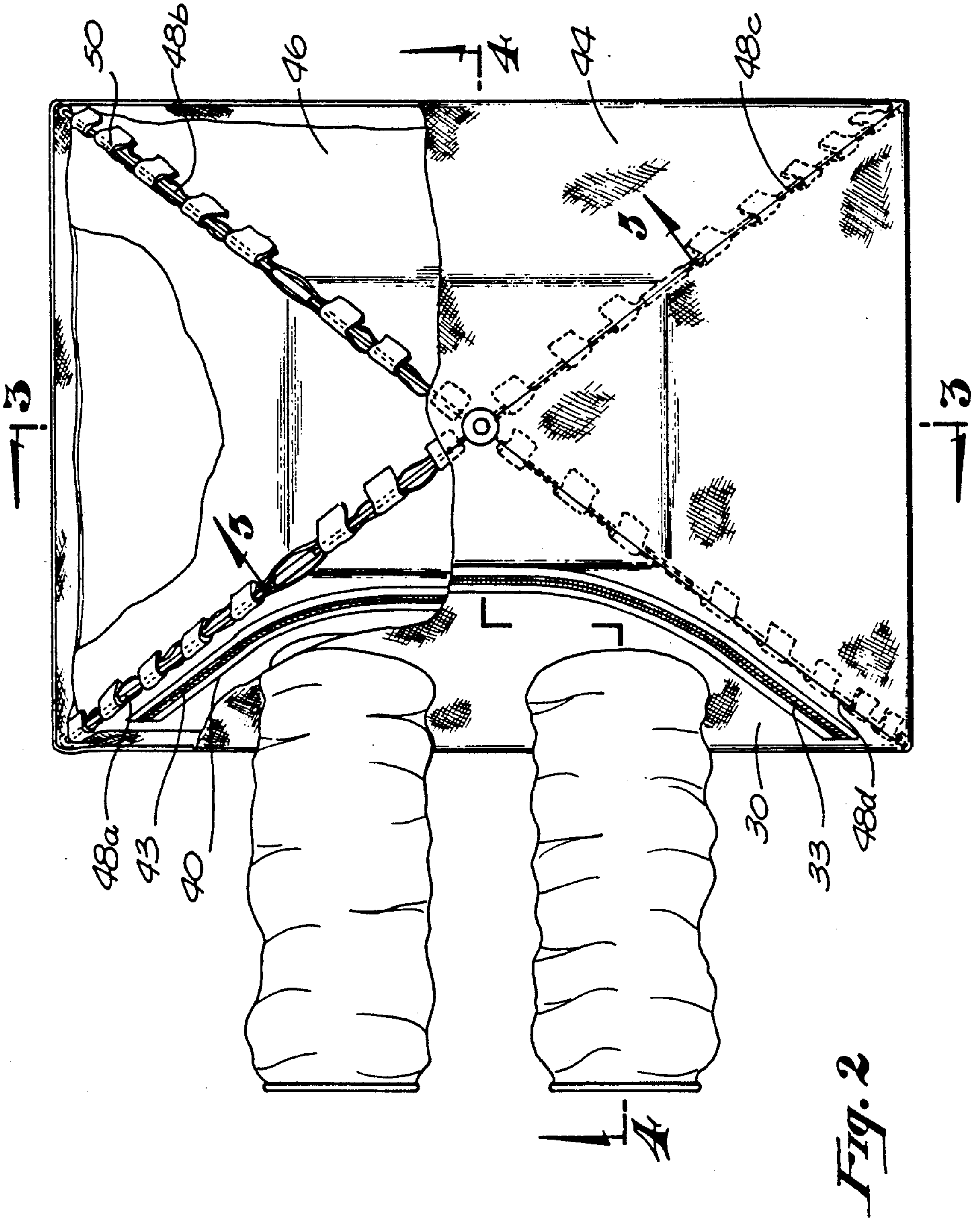
FIG. 2 is a top plan view of the present invention showing a portion of the exterior layer removed, a portion of the interior layer removed, and the support members and loops enclosing the support members shown in ghostlines.

On one side, which is preferably, but not necessarily, the same side in which the sleeves are disposed, there is provided an access means to the interior of the film changing tent 10. As shown in FIG. 1, for example, the access means comprises zippers 35 and 36 which may open or close to allow flap 30 to be opened to insert film, a camera, film canisters and the like therein. As shown in FIG. 2, and particularly in the cut-away portion, there is provided a second door for the interior layer of the film changing tent as described more fully below, the second door 40 and zipper 43 permitting the opening of the interior layer.

Figure 4:
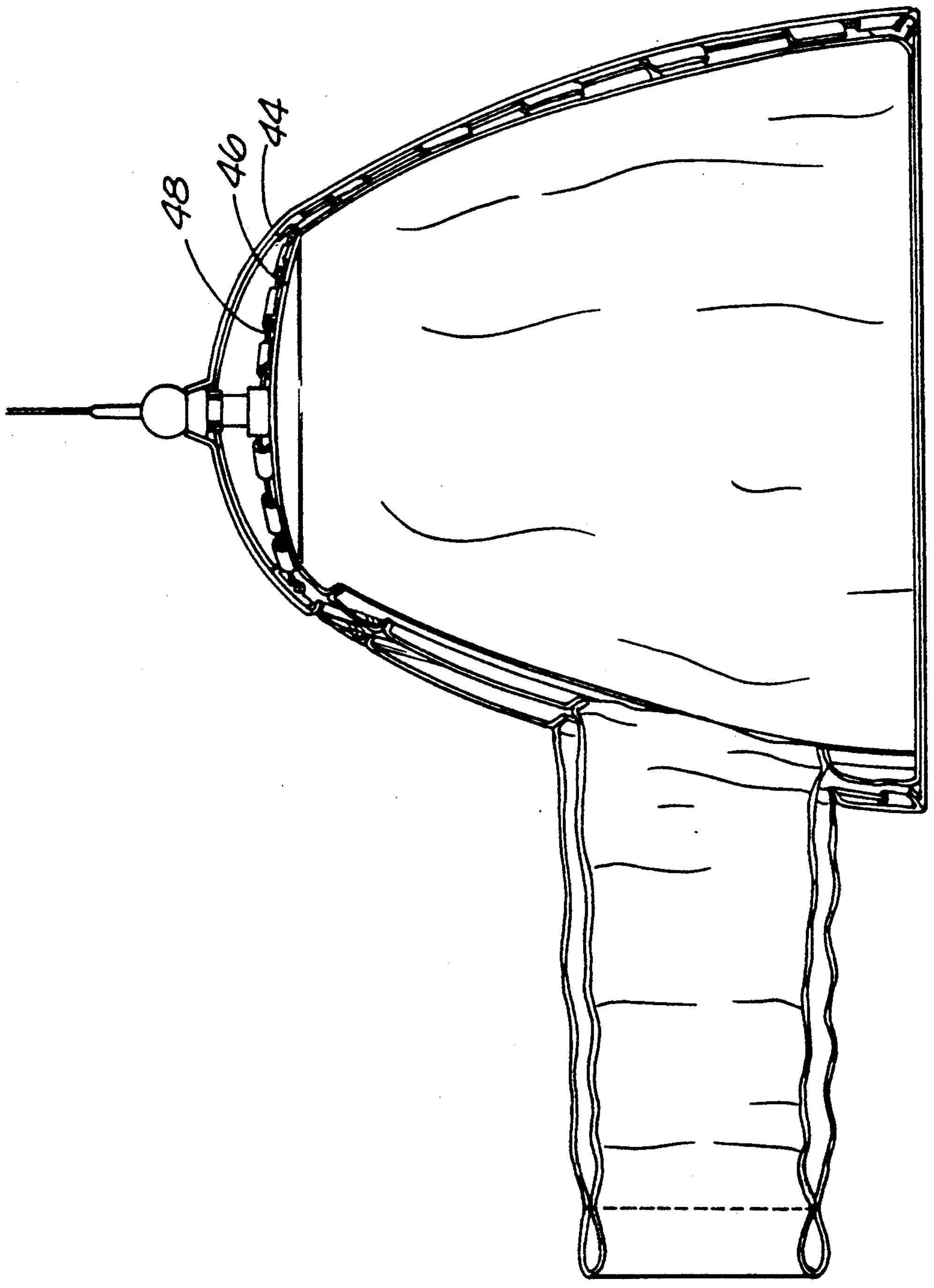
FIG. 4 is a cross-sectional view of the present invention taken through Lines 4—4 of FIG. 2 showing another view of the interior section of the present invention including one of the arm members.

As best shown in FIGS. 2, 3 and 4, the film changing tent is formed of multiple-ply material. In the preferred embodiment as shown in the Figures, a two-ply material is provided in which any seams in one layer are not overlapped with seams in the other layer. This configuration prevents the entry of light into the film changing tent as is known in the art. Preferably, the outer layer 44 is a generally reflective material such as the type commonly used in photographic applications to reflect or bounce light. The inner layer comprises a dark, black or other colored coated nylon taffeta material. It will be obvious to a person of ordinary skill in that art that, while I have described herein the preferred materials, other materials known in the art may be substituted therefor.

As specifically shown in FIGS. 2–4, the invention comprises a support structure which is preferably disposed between the outer layer 44 and the inner layer 46. The support structure is preferably disposed along the seams between the respective sides 12, 13, 14 or 15 of the film changing tent 10.

As best shown in FIG. 2, a metal rod 48 a–d is disposed along each seam such that metal rods 48*a* and 48*b* are shown solid lines in the cut-out view in which the outer layer 44 is cut away from a portion of the film changing tent 10 and metal rods 48*c* and 48*d* are shown in ghost lines with outer layer 44 shown thereon. The metal rods are held in place by a plurality of sewn loops 50 which are sewn onto the inner layer 46. It will be obvious to a person of ordinary skill in the art that many other methods such as gluing, sewing, utilizing elastic hooks, or many other methods known in the art, may be used to retain the support rods in position.

Figure 5:
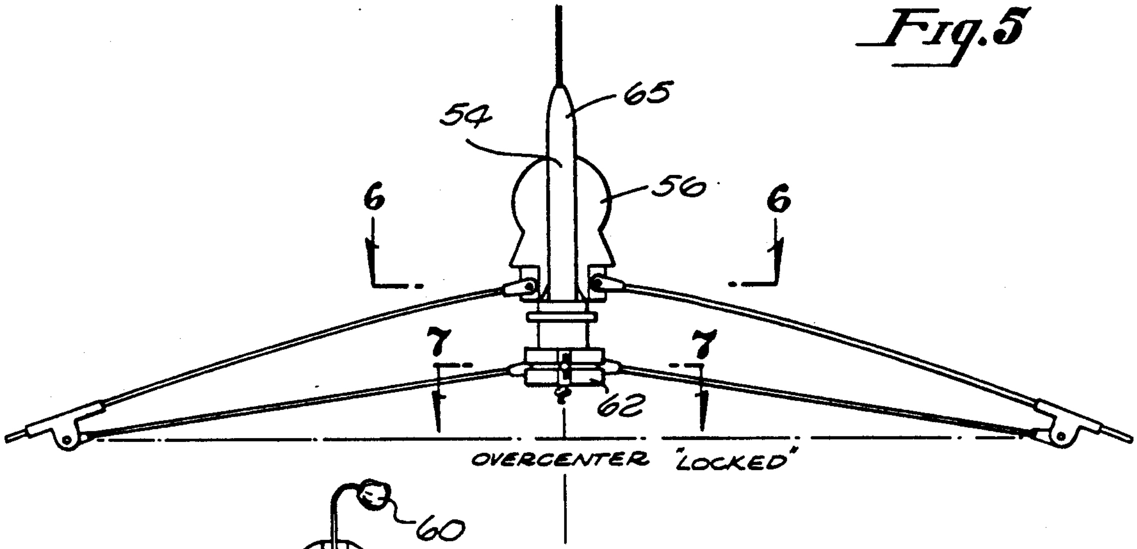
FIG. 5 is a side view of the support structure of the present invention in an opened or locked position.
Figure 9:
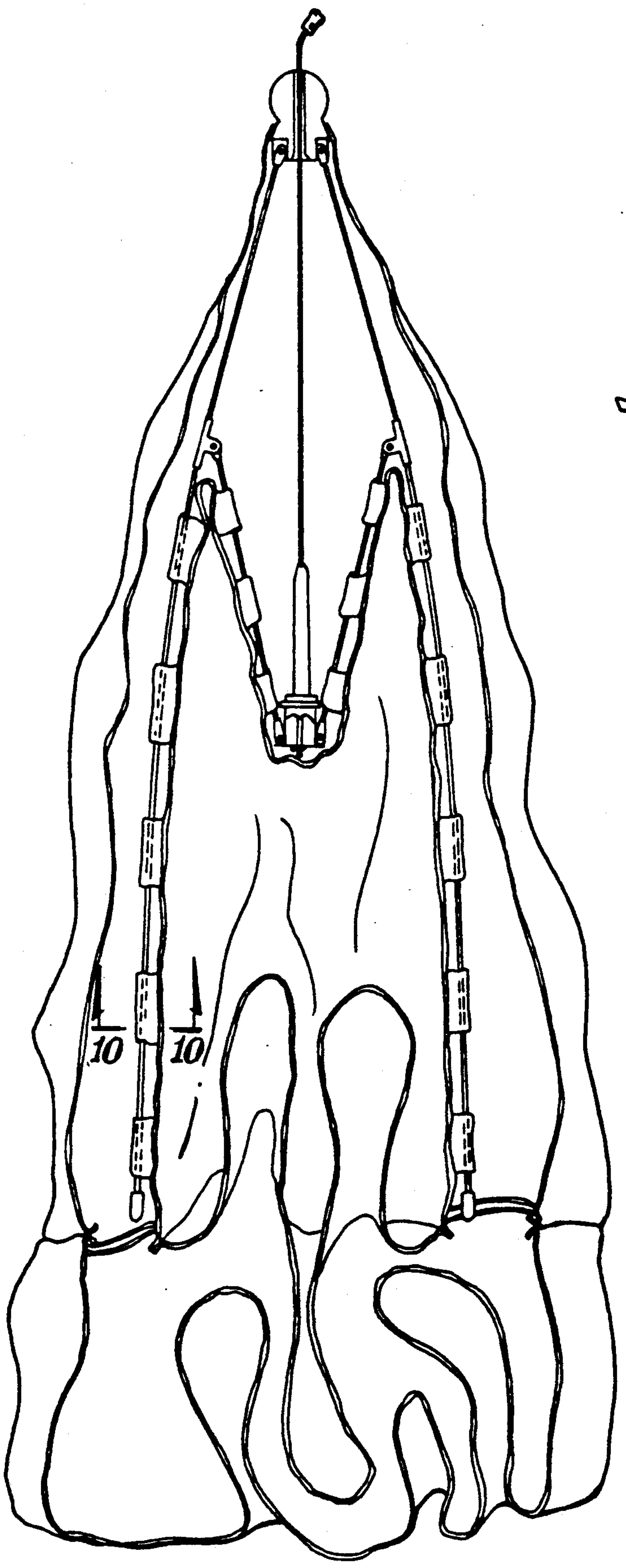
FIG. 9 is a side view of the present invention in its closed position shown in partially cut-away view so that the support structure is shown.

As used in the preferred embodiment, the support structure is designed in an umbrella-like configuration so that it can be easily set up and taken down with minimal effort and no extraneous parts. The tent support means, as shown in FIGS. 5–8, comprises support rods 48, center member 52, coupling rods 53 which attach center member 52 to support rods 48 by means of pivotal coupling members 49, an enlarged center member 54, which in one position as shown in FIG. 5 is adapted to be inserted through hole 58 in top center member 56. Center member 52 is preferably string or other flexible material and has a cap or stop 60 disposed at one end to prevent it from being pulled through the top center member 56. The device can be over-center locked as shown in FIG. 5. The bottom member 62 is pulled past the over-center locked position so that the support rods are locked in the open position. When enlarged center member 54 is fully disposed within top center member 56 the support members remain in a locked position. To unlock the support members, the enlarged center member 54 is pushed down so that the bottom center member 62 is pushed past the over center locked position and the device is allowed to collapse. A depiction of the collapsed device is shown in FIG. 9 which illustrates a sectional view of a collapsed film changing tent.

Figure 6:
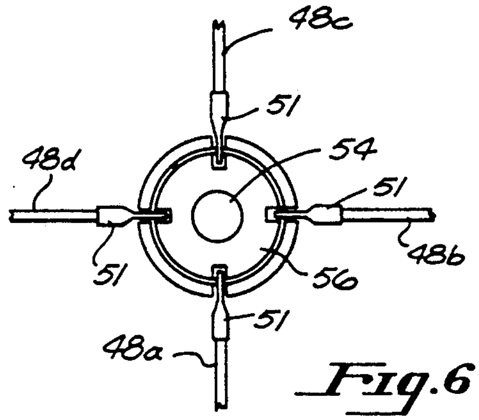
FIG. 6 is a top view of the support structure of the present invention taken through Lines 6—6 of FIG. 5.
Figure 7:
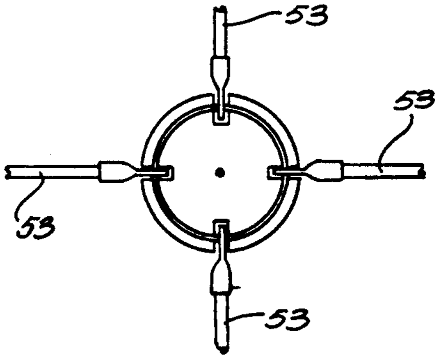
FIG. 7 is a sectional view of the support structure of the present invention taken through Lines 7—7 of FIG. 5.
Figure 8:
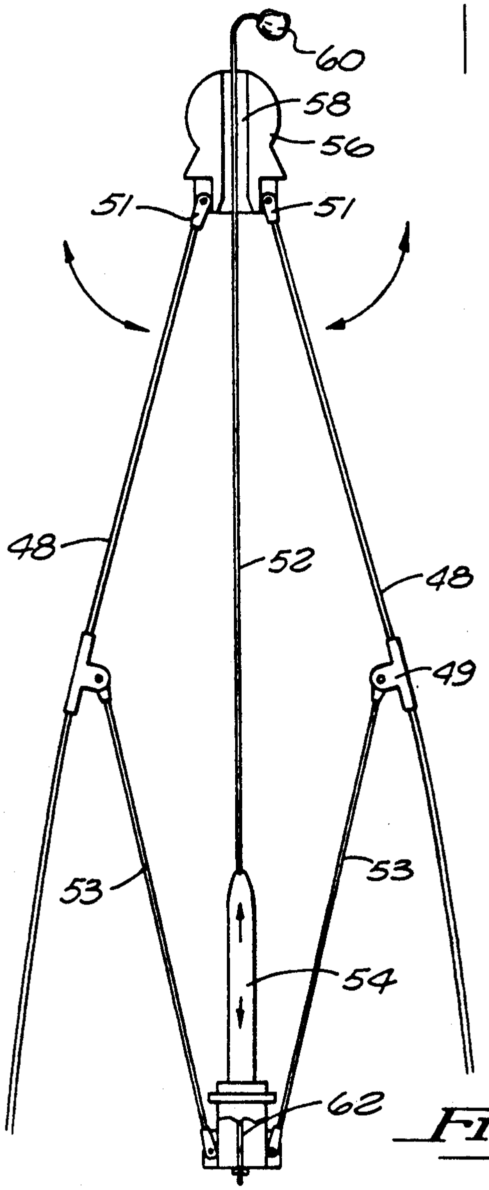
FIG. 8 is a side view of the support structure of the present invention shown in its collapsed or closed position.

As specifically shown in FIGS. 6–7, which are sectional views of the top center member 56 and bottom center member 62 and adjoining materials, on the top center member 56 the support rods 48 a–d are pivotally connected thereto, and on the bottom center member, the connecting members 53 are attached thereto by pivotal connecting means 51. At the bottom center member 54, the connecting members 53 are attached thereto by connecting members 49.

Figure 10:
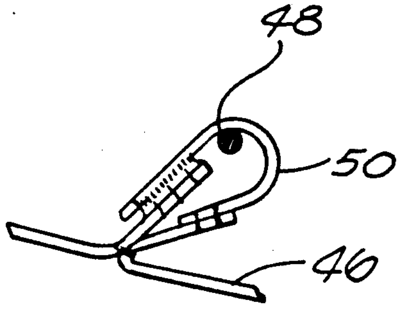
FIG. 10 is a cross-sectional view of a support loop for holding the support member shown in cross-sectional view and taken through Lines 10—10 of FIG. 9.

FIG. 10 shows a cross-sectional view of a support rod 48 disposed in a loop 50. Loop 50 is sewn to the edges of two adjoining panels (i.e., panels 12 and 13) of the inner liner 46. The inner liner is also sewn at the base. This sewing configuration which is known in the art provides a generally secure light-tight configuration. Supporting rod 48 is disposed therein.

Operation of the film loading tent is as follows. When the film changing tent 10 is taken into the field, it is taken in its collapsed configuration, as generally shown in FIG. 9. It thus can be stored in a cylindrical container or unstored and just held together in a collapsed position.

To assemble the film changing tent, the cap 60 is pulled upward exposing the center member 52 and pulling enlarged center member 54 up and into position inside hole 58 so that the tip 65 extends through top member 56. When bottom center member 62 is pulled past the over center locked position, the tent is fully assembled. The sleeves 18 and 20 are pulled outward for easy access by a user. In order to place film in cannisters, tubes, cameras and the like inside the film changing tent, zipper 33 is opened and door 30 is pulled down exposing zipper 43 and door 40. Similarly, zipper 43 is opened and door 40 is pulled down exposing the interior of film changing tent 10. The camera, film, cannisters or other devices are placed inside the film changing tent and both door 40 and door 30 are closed and zipped tightly. The user then places one arm in each sleeves 18 and 20 in a manner such that cuffs 22 and 23 are snug around the users arms. The film changing process is performed inside the film changing tent.

When completed, the user removes his arms from the sleeves. The changed film is then removed by opening the zippers 33 and 43 and removing the changed films through the doors 30 and 40. To collapse the film changing tent, the enlarged center member 54 is pushed downward past the overlock position and the film changing tent is again collapsed.

Although the drawings and specification relate to the preferred embodiment, it is understood that various modifications and alternations may be made therein without departing from the spirit and scope of the present invention.

I claim:

1. A collapsible film changing tent comprising:

inner and outer light-impervious fabric shells connected to a light-impervious fabric floor around the periphery thereof defining an enclosure;

support means integrably connected to at least one fabric shell, said support means comprising an umbrella-like frame having an over center locking means and said support means being disposed between said outer shell and said inner fabric shell;

a pair of light-impervious fabric sleeves in communication with said enclosure extending from outside said outer shell; and a door having a closure mechanism in one side of said outer shell at least in partial registry with a door having a closure mechanism in said inner shell.

2. The film changing tent of claim 1 wherein said support means is fixably attached to said inner shell.

3. The film changing tent of claim 1 wherein said inner shell comprises neoprene-coated taffeta and said outer shell comprises metallic coated fabric.

4. The film changing tent of claim 1 wherein all seams in the outer liner are offset from all seams in the inner liner.

5. The film changing tent of claim 1 wherein said support means is connected to said inner fabric shell by fabric loops.

6. The film changing tent of claim 1 wherein said sleeves are adjacent each other on a single side of said film changing tent.

7. The film changing tent of claim 1 wherein said sleeves are on adjacent sides.

8. The film changing tent of claim 1 wherein said support means comprises a central top member with support members pivotably attached thereto, a centrally disposed lower member coupled to coupling members which slideably engage said support members, said bottom central member being pivotably connected to said coupling members; a generally cylindrically shaped male member attached to said bottom member thereabove and adapted to fit inside a bore through said top member; an activating member comprising a flexible material attached to said male member at one end and having an enlarged portion at the other end, larger than said bore of said top member;

whereby said film changing tent is in a collapsed position said male member is disposed within said film changing tent and when said film changing tent is in operational mode, said male member is partially extended through said bore in an over center locked position relative to said coupling members.

* * * * *